(12) United States Patent
Mimberg (10) Patent No.: US 7,289,539 B1
(45) Date of Patent: Oct. 30, 2007

(54) SYNCHRONIZATION OF STEREO GLASSES IN MULTIPLE-END-VIEW ENVIRONMENTS

(75) Inventor: Ludger Mimberg, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1185 days.

(21) Appl. No.: 10/218,679

(22) Filed: Aug. 14, 2002

(51) Int. Cl.
*H04J 3/06* (2006.01)

(52) U.S. Cl. ............... 370/503; 370/537; 345/418; 375/364

(58) Field of Classification Search ............... None
See application file for complete search history.

(56) References Cited

U.S. PATENT DOCUMENTS

| | | | | |
|---|---|---|---|---|
| 4,286,286 A | * | 8/1981 | Jurisson et al. ............... | 348/56 |
| 5,523,886 A | * | 6/1996 | Johnson-Williams et al. ............... | 359/464 |
| 5,619,256 A | * | 4/1997 | Haskell et al. ............... | 348/43 |
| 5,835,264 A | * | 11/1998 | Tandler et al. ............... | 359/377 |
| 6,008,839 A | * | 12/1999 | Nagele et al. ............... | 348/47 |
| 2003/0137528 A1 | * | 7/2003 | Wasserman et al. ............... | 345/700 |

* cited by examiner

*Primary Examiner*—Duc Ho
(74) *Attorney, Agent, or Firm*—Townsend and Townsend and Crew LLP; J. Matthew Zigmant (57) ABSTRACT

Methods and apparatus for synchronizing a stereo viewing device in a multiple end-view environment. Two or more video streams and a corresponding number of signals, each synchronous with one of the video streams, are provided. Each of the video streams may have a different refresh rate. One of the video streams is selected for stereo viewing, and a corresponding synchronizing signal is selected. The selected synchronizing signal is used to generate a control signal that synchronizes a stereo viewing device to the selected video stream.

26 Claims, 7 Drawing Sheets

SYNCHRONIZATION OF STEREO GLASSES IN MULTIPLE-END-VIEW ENVIRONMENTS

BACKGROUND OF THE INVENTION

The present invention relates to the synchronization of stereo viewing devices, particularly the synchronization of stereo glasses in multiple-end-view environments.

Stereo graphics are becoming commonplace in applications such as gaming, computer-aided design, and the like. For example, three-dimensional (3-D) computer graphics applications render separate images for a user's right eye and left eye, thereby providing the user with a stereoscopic visual experience. Real-time 3-D computer graphics render a stream of video to each eye, thus becoming a stereo video stream. One way to provide a stereo video stream is to send left and right views of a series of images to a monitor (or head or end view), where the view alternates with each frame. A user observes the video stream with a stereo viewing apparatus such as a pair of stereo glasses or goggles. Stereo glasses close a shutter over a users left eye when a right view is displayed, while a shutter over the right eye is closed when a left view is displayed. For best performance, and to avoid user fatigue, the shutters should open and closed synchronously with the stream at least 60 times per second, which requires a monitor refresh rate of 120 Hz, though lower refresh rates may also be used. Accordingly, most users set the refresh rate to the maximum supported by the monitor they are using. A stereo video stream can include non-stereo components; for example, an application program can render stereo images to a window within a computer desktop, which means the user sees a stereo scene within an otherwise non-stereo video display.

A problem arises when stereo glasses are used in a multihead system where different monitors displaying stereo graphics run at different refresh rates, or run at the same refresh rate but are not synchronized to each other. This may happen if two or more monitors have different maximum refresh rates, and are set to run at their maximum rates. If the glasses are synchronized to a stereo video stream on a first monitor having a certain refresh rate, when another stereo video stream on a second monitor having a different rate is viewed, the stream is not viewed in stereo, that is, the stream is not properly reconstructed.

Accordingly, what is needed are methods and apparatus for synchronizing stereo glasses or other viewing apparatus to a monitor that is displaying stereo content in a multiple monitor or end-view system. Also, the methods and apparatus should selectively change which video stream the glasses are synchronized to based on changes in displayed content or other information.

SUMMARY

Accordingly, embodiments of the present invention provide methods and apparatus for synchronizing stereo glasses or other viewing devices to a stereo video stream displayed in a multiple monitor or end-view system. Also, embodiments of the present invention can selectively change the video stream that the glasses are synchronized with. Specifically, if two or more monitors display stereo graphics at different refresh rates, the glasses are selectively synchronized to one stream, and that stream is viewed in stereo. The selection may be based on the most recent application started, it may be made by the user, it may be based on inputs from a keyboard or mouse, or other criteria.

After an stream is selected, by the user, the graphics system, or otherwise, a signal that is synchronous with the selected stream, for example the vertical sync signal, is selected and used to generate a stereo control signal, which is provided to the stereo glasses.

An exemplary embodiment of the present invention provides a method of synchronizing a stereo viewing device to a selected video stream. This method includes providing a plurality of video streams, each including a synchronizing signal, receiving a select signal generated to select one of the plurality of video streams, and selecting a first signal using the select signal. The first signal is a synchronizing signal for the selected video stream. The method further includes using the first signal to generate a second signal, and providing the second signal to the stereo viewing device.

A further exemplary embodiment of the present invention provides a method of synchronizing a stereo viewing device to a selected video stream. This method includes receiving a plurality of signals, each of the plurality of signals synchronous with one of a corresponding plurality of video streams, receiving a select signal generated to select one of the plurality of signals, and selecting a first signal in the plurality of signals using the select signal. The first signal is synchronous with the selected video stream. The method further includes receiving a second signal, the second signal generated to control the stereo viewing device, generating a third signal by retiming the second signal using the first signal, and providing the third signal to the stereo viewing device.

A further exemplary embodiment of the present invention provides a method of synchronizing a stereo viewing device to a video stream. The method includes receiving a plurality of signals, each of the plurality of signals synchronous with one of a corresponding plurality of video streams, receiving a select signal generated to select one of the plurality of signals, and selecting a first signal from the plurality of signals using the select signal. The first signal has a first frequency. The method also includes dividing the frequency of the first signal to generate a second signal having a second frequency, and providing the second signal to the stereo viewing device.

Yet a further exemplary embodiment of the present invention provides a circuit for synchronizing a stereo viewing device to a video stream. The circuit includes a graphics system configured to generate a first video stream, a second video stream, a first signal synchronous with the first video stream, a second signal synchronous with the second video stream, and a third signal to select the first signal or the second signal. The circuit also includes a logic circuit configured to receive the first signal, the second signal, and the third signal, and it provides a fourth signal to the stereo viewing device.

Yet another exemplary embodiment of the present invention provides another circuit for synchronizing a stereo viewing device to a video stream. This circuit includes a logic circuit configured to receive a first signal synchronous with a first video stream, a second signal synchronous with a second video stream, and a third signal generated to select the first signal or the second signal. The circuit is further configured to provide a fourth signal to the stereo viewing device.

Still another embodiment of the present invention provides another method of synchronizing a stereo viewing device. This method includes providing a plurality of video streams, wherein the plurality of video streams are not synchronized, synchronizing the stereo viewing device to a first video stream in the plurality of video streams, and receiving a selection of a second video stream in the plurality of video streams. The method also includes synchronizing the stereo viewing device to the second video stream. In this method, the selection may made by the user, and the selection may cause the first video stream to change from a first stereo mode to a first non-stereo mode, and the second stereo stream to change from a second non-stereo mode to a second stereo mode.

A better understanding of the nature and advantages of the present invention may be gained with reference to the following detailed description and the accompanying drawings.

DESCRIPTIONS OF EXEMPLARY SPECIFIC EMBODIMENTS

Figure 1:
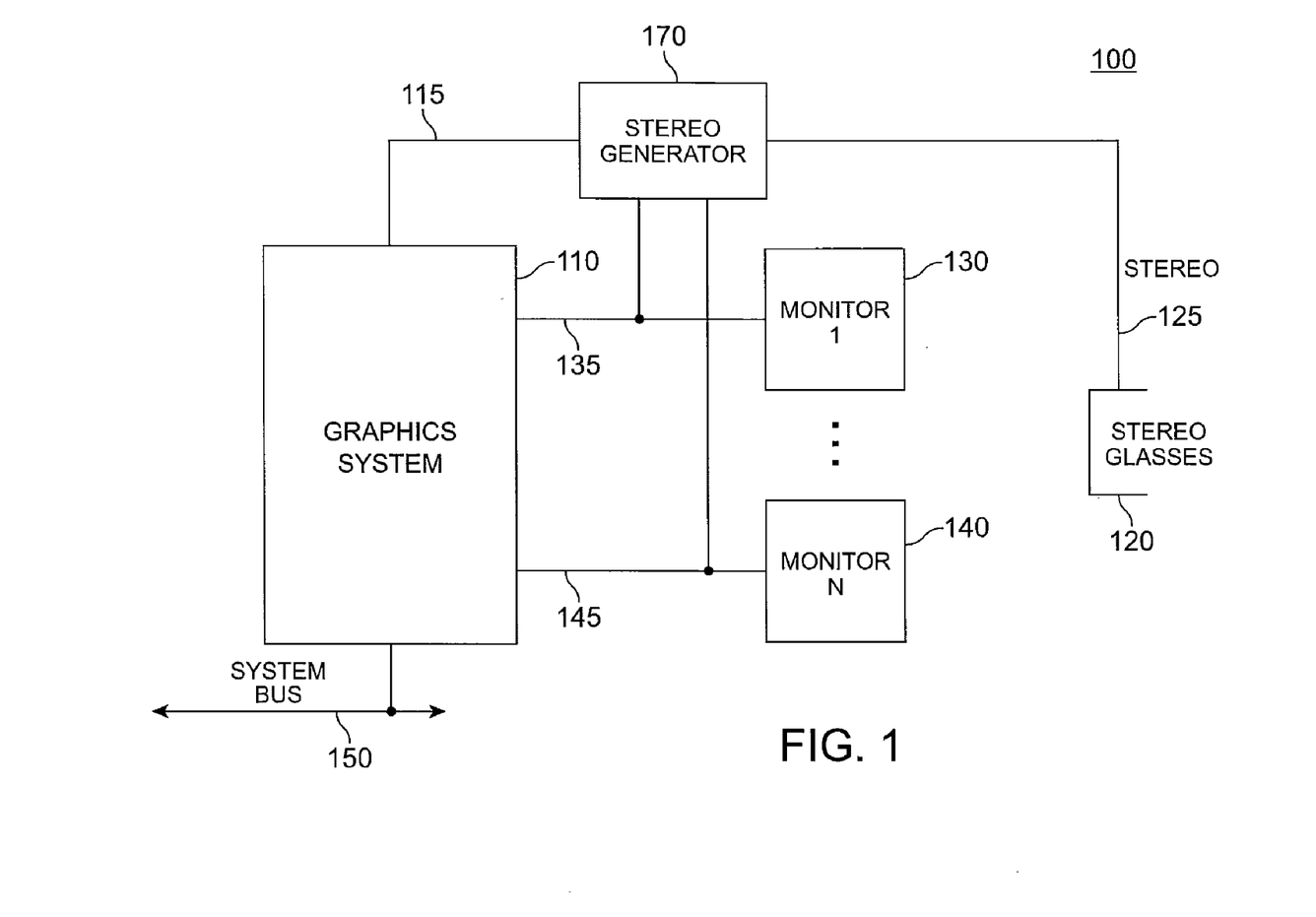
FIG. 1 is a block diagram of a multiple-end view graphics system incorporating an embodiment of the present invention.

FIG. 1 is a block diagram of a multiple-end view graphics system incorporating an embodiment of the present invention. Included are a graphics system 110 coupled to a system bus 150, first monitor 130, last monitor 140, stereo signal generator 170, and a pair of stereo glasses 120. This figure, as with all the included figures, is shown for exemplary purposes only, and does not limit either the possible embodiments of the present invention or the claims.

The graphics system 110 may be a graphics board residing in a computer system. For example, the graphics system 110 may be a printed circuit board based on a GeForce3 integrated circuit manufactured by nVidia corporation, located at 2701 San Tomas Expressway Santa Clara, Calif. 95050. Alternately, the graphics system may be two or more graphics boards, which may be connected to or part of one or more computers or computer systems. Video information is received by the graphics system 110 on system bus 150. System bus 150 may be coupled to one or more or processors or computer systems. The graphic system 110 provides a number of outputs, such as outputs 135 and 145, which provide video signals and timing information to monitors 130 and 140.

While embodiments of the present invention may be used in systems where only one output is provided by graphics system 110 to one monitor 130, the benefits of the present invention are particularly useful in systems where there are two or more monitors. For example, embodiments of the present invention may be used where two monitors are coupled to a graphic system 110. Other embodiments of present invention may be used in systems where there are three, four, or more monitors. The monitors may each be a CRT, flat panel, or other display device.

The graphics system 110 provides some form of right/left information on line 115 to the stereo generator 170. The stereo generator also receives timing information from some or all the graphic system outputs, such as 135 and 145, and provides a stereo signal on line 125 to the stereo glasses 120. The stereo generator 110 may be integrated or incorporated with the graphics system 110, it may be on a board that is part of the graphics system 110, or it may be separate from graphics system 110. The stereo glasses 120 may be stereo glasses of the type that alternately shutter the right and left eyes synchronously with the frames being displayed by one of the monitors. These glasses close the right eye when the stereo signal is of one polarity, and closes the left when the stereo signal has the other polarity. Alternately, the stereo glasses 120 may be other types of viewing apparatus, such as panels.

The graphic system 110 determines which monitor the stereo glasses 120 should be synchronized to. For example, if monitor 1130 displays a stereo video stream and monitor N 140 does not, the stereo glasses are timed to video frames on monitor 1. Conversely, if the last monitor N 140 is displaying stereo graphic information and monitor 1 130 does not, graphics system 110 synchronizes the stereo glasses 120 to the video frames displayed on the last monitor N 140.

In cases where two or more monitors are displaying stereo video streams, other algorithms for deciding which monitor the stereo glasses should be synchronized with may be used. For example, sensing devices may be used to determine which monitor the viewer is observing, and the stereo glasses can be synchronized accordingly. Alternately, the most recently started stereo application being displayed may likely be the application being observed, and its synchronizing information may be selected. Select buttons may be provided and accessed by input devices such as a mouse or keyboard. Also, mouse or keyboard activity may indicate which monitor is being viewed, and the glasses synchronized accordingly. The selection of a new video stream for synchronization with a stereo viewing device may cause the previously synchronized video stream to change from a stereo mode to a non-stereo mode, and the newly synchronized video stream to change from a non-stereo mode to a stereo mode.

Figure 2:
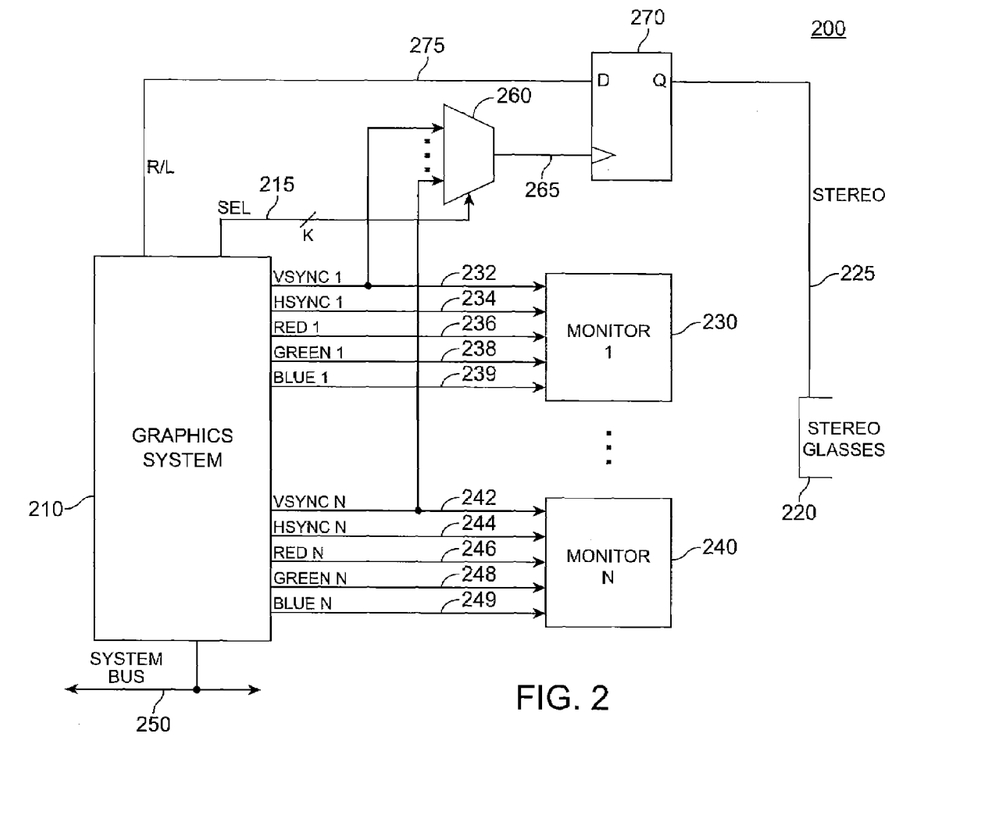
FIG. 2 is a block diagram of an exemplary embodiment of the present invention.

FIG. 2 is a block diagram illustrating an exemplary embodiment of the present invention. Included are a graphic system 210 coupled to a system bus 215, stereo glasses 220, first monitor 230, last monitor 240, multiplexer 260, and flip-flop 270. Again, the graphics system 210 may be a graphics board residing in a computer system. Alternately the graphic system may be two or more graphics boards housed in one or more computers or computer systems. Graphics system 210 provides video information to the first monitor 230 and the last monitor 240. Again, in other embodiments there may be video information supplied to only one monitor, or two or more monitors. The graphic system 210 receives video and timing information on the system bus 250 from one or more processors or computer systems.

The graphic system 210 provides timing information, in this example the vertical and horizontal signals Vsync1 on line 232 and Hsync1 on line 234, to the first monitor 230. The graphic system 210 also provides video information, specifically, red, green, and blue on lines 236, 238, and 239 to the first monitor 230. In other embodiments, different timing and video signals may be provided. For example, S-video or RCA signals may be used, or the vertical sync information may be combined with the green color information. Also, the signals may be analog or digital. In this example, the graphic system 210 provides similar information to other monitors such as the last monitor 240. Specifically graphics system 210 provides the VsyncN and HsyncN on lines 242 and 244, and red, green, and blue on lines 246, 248, and 249.

Multiplexer 260 receives at its inputs some or all of the vertical sync signals provided by the graphic system 210 to the monitors. Specifically, multiplexer 260 receives Vsync1 on line 232 and VsyncN on line 242.

Again, the graphic system 210 determines which monitor the stereo glasses 220 should be synchronized to. For a specific embodiment of the present invention, if monitor 1 230 is displaying a stereo video stream and monitor N 240 is not, the stereo glasses are timed to video frames on monitor 1. Conversely, if monitor N 240 is displaying stereo graphic information and monitor 1 is not, graphics system 210 synchronizes the stereo glasses 220 to the video frames displayed on the last monitor 240.

Specifically, multiplexer 260 selects the sync signal corresponding to the sync signal provided by the graphic system 210 to the monitor that is displaying the stereo application. Again, for example, if monitor 1 is displaying stereo graphic information while the last monitor 240 is not, multiplexer 260 selects Vsync1 on line 232 and provides it is an output on line 265. Conversely, if monitor N 240 is displaying stereo video stream while monitor 1 230 is not, multiplexer 260 selects VsyncN on line 242 and provides that signal as an output on line 265.

Again, in cases where two or more monitors display stereo video streams, other algorithms for deciding which monitor the stereo glasses should be synchronized with may be used. As before, sensing devices may be used to determine which monitor the viewer is observing, and the stereo glasses can be synchronized accordingly. Alternately, the most recently started stereo application being displayed may likely be the application being observed, and its synchronizing information may be selected by multiplexer 260. Again, selects buttons may be provided, and accessed by input devices such as a mouse or keyboard.

Multiplexer 260 selects the appropriate Vsync signal under control of the SEL line or lines 15. Where a system includes two monitors, only one select line 215 is needed. Where there are more monitors, more selects lines 215 may be needed to carry the select signal, or select information may be stored by multiplexer 260. For example, if four monitors are used, four select signals may be provided by the graphics system 210 to multiplexer 260—one for each sync signal—or two select signals may be provided and binarily decoded. The selected sync signal is provided as an output by multiplexer 260 on line 265. In this specific example, the signal on 265 drives the clock input of flip-flop 270.

Flip-flop 270 resynchronizes the right/left signal provided by graphic system 210 on line 275. The right/left signal indicates whether the right or left eye information of the selected stereo video stream is about to be provided to its monitor. Since it is being retimed by the Vsync signal, the right/left signal on line 275 may be asynchronous to the video information being displayed. In a specific embodiment of the present invention, the interrupt latency times of the driver and operating system skew the right/left information in a variable manner as compared to the vertical sync timing information. Since the right/left signal on line 275 is being retimed to the sync information on line 265, the timing criteria for the right/left signal is that it meets the set-up and hold time for the flip-flop 270. In a specific example of the present invention, set-up and hold times of 4.5 and 1 nsec respectively should be met by the right/left signal on line 275. The flip-flop 270 synchronizes the right/left information on line 275 to the selected Vsync signal on line 265 and provides an output stereo signal on line 225 to the stereo glasses 220.

Figure 3:
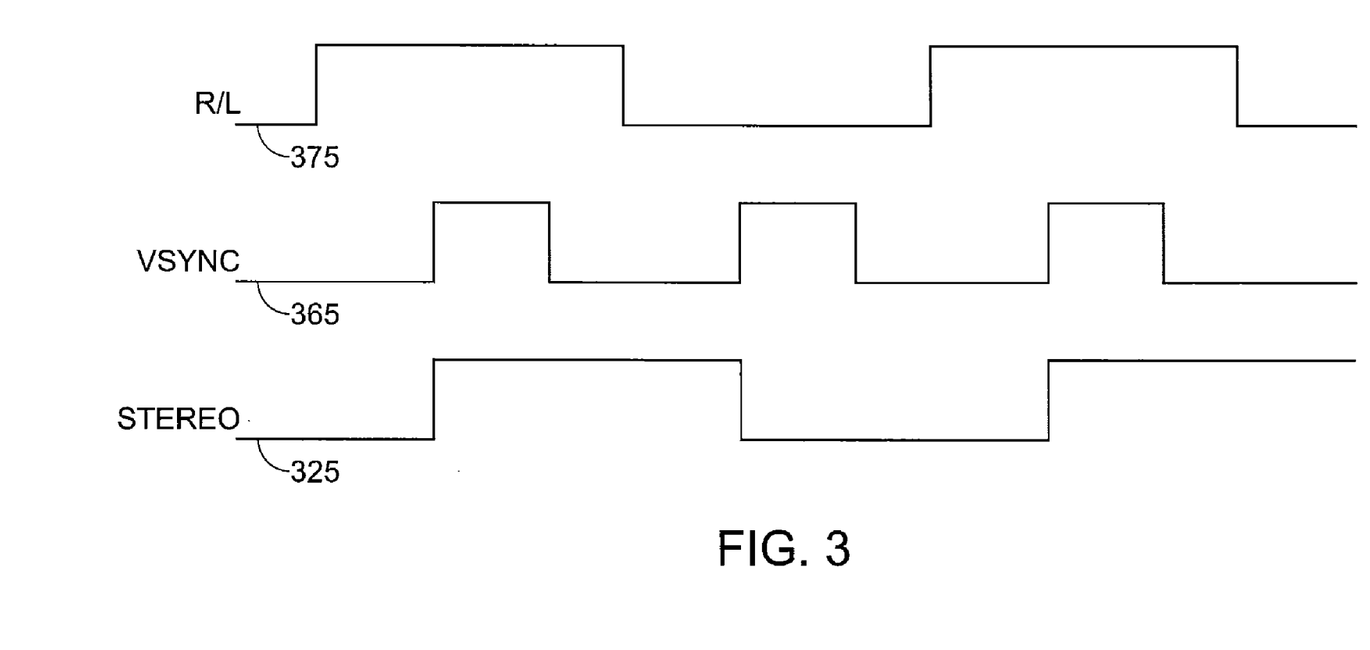
FIG. 3 is a timing diagram illustrating the operation of the circuit of FIG. 2.

FIG. 3 is a timing diagram illustrating the operation of the circuit of FIG. 2. Included are a right/left signal 375, which may be the right/left signal on line 275, a Vsync signal 365, which may be the selected Vsync signal on line 265, and a stereo signal 325, which may be the stereo signal on line 225 in FIG. 2. The right/left signal 375 alternates between two logic levels. In a specific embodiments, in this signal is compliance with the VESA standard such that a low or a "0" corresponds to the display of the right eye information, while a high or a "1" corresponds to the display of left eye information. In other embodiments of the present invention, this signal in convention may be reversed.

When the Vsync signal 365 is a low or a "0," video information is being provided to the monitor, and when Vsync 365 is high or a "1," a vertical retrace is occurring. Again, this convention may be reversed in alternate embodiments of the present invention. The stereo signal 325 is the right/left signal 375 retimed by the Vsync signal 365. Specifically, when Vsync 365 goes high, the stereo signal 325 follows the polarity of the right/left signal 375. Again, the right/left signal should meet the set-up and hold time requirements of the flip-flop or other retiming circuit used. By changing the polarity of the stereo signal 325 at the beginning of the vertical retrace, the shutters on the stereo glasses may physically change position while the vertical retrace is occurring, instead of when video graphics information is being displayed. In other embodiments, the falling edge of the Vsync signal may clock the flip-flop or other retiming circuit.

Figure 4:
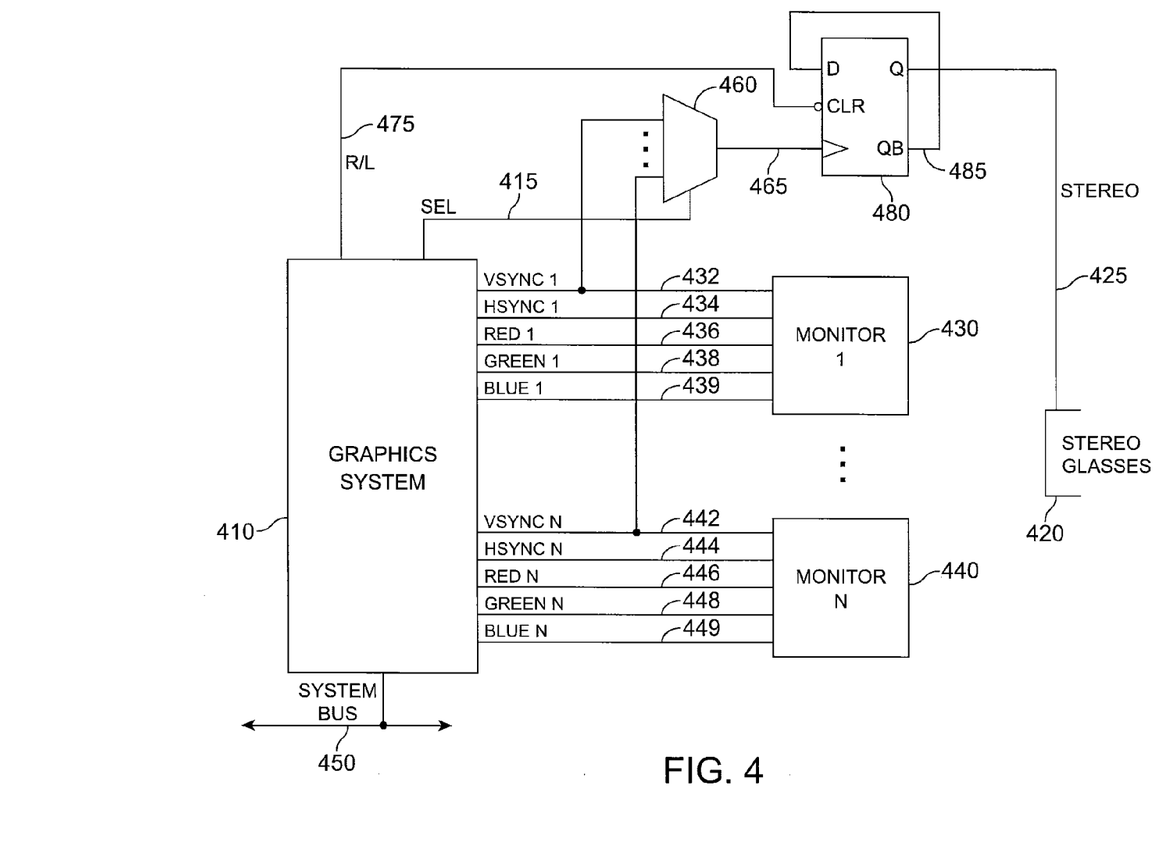
FIG. 4 is a block diagram of another exemplary embodiment of the present invention.

FIG. 4 is a block diagram illustrating another exemplary embodiment of the present invention. Included are a graphic system 410 coupled to a system bus 415, stereo glasses 420, first monitor 430, last monitor 440, multiplexer 460, and flip-flop 480. Again, the graphics system 410 may be a graphics board residing in a computer system. Alternately, the graphic system may be two or more graphics boards housed in one or more computers or computer systems. Graphics system 410 provides video information to the first monitor 430 and the last monitor 440. Again, in other embodiments there may be video information supplied to only one monitor, or two or more monitors. The graphic system 410 receives video and timing information on the system bus 450 from one or more processors or computer systems.

The graphic system 410 provides timing information, in this example the vertical and horizontal signals Vsync1 on line 432 and Hsync1 on line 434 to the first monitor 430. The graphic system 410 also provides video information, in this example, red, green, and blue on lines 436, 438, and 439 to the first monitor 430. In other embodiments, different timing and video signals may be provided. In this example, the graphic system 410 provides similar information to other monitors such as the last monitor 440. Specifically, graphics system 410 provides the VsyncN and HsyncN on lines 442 and 444, and red, green, and blue on lines 446, 448, and 449.

Multiplexer 460 receives as its inputs some or all of the vertical sync signals provided by the graphic system 410 to the monitors. Specifically, multiplexer 460 receives Vsync1 on line 432 and VsyncN on line 442. Multiplexer 460 selects the appropriate Vsync signal under control of SEL line or lines 415. Where are a system includes two monitors, only one select line 415 is needed. Where there are more monitors, more selects lines 415 may be needed, or select information may be stored by multiplexer 460. The selected sync signal is provided as an output by multiplexer 460 on line 465. In this a specific example, the signal on 465 drives the clock input of flip-flop 480. Flip-flop 480 divides the sync signal provided as a clock by the multiplexer 460 on line 465. The flip-flop 480 divides the selected Vsync signal on line 465 and provides an output stereo signal on line 425 to the stereo glasses 420.

The divide-by-two flip-flop 480 may skip or double clock a Vsync pulse, or otherwise become inverted from its desired polarity. This may happen due to power supply coupling or noise, signal feedthrough, clock noise, or other circuit phenomenon. Also, at startup, the stereo signal on line 425 might not begin in the correct state (though a pull down resistor on line 475 can be used for this purpose). Accordingly, a right/left signal on line 475 is provided by the graphic system 410 to a CLRB input of flip-flop 480. The right/left signal on line 475 may be asserted low to clear the flip-flop 480, that is, force the stereo output on line 425 to be low. In this way, the right/left signal on line 475 may be asserted by the graphic system 410 when it is not busy executing other operations. Several frames may be displayed before the right/left signal on line 475 is asserted low. If the output of the divide-by-two flip-flop 480 becomes inverted, a low value for the right/left signal on line 475 clears the flip-flop 480, thus correcting the inversion.

Figure 5:
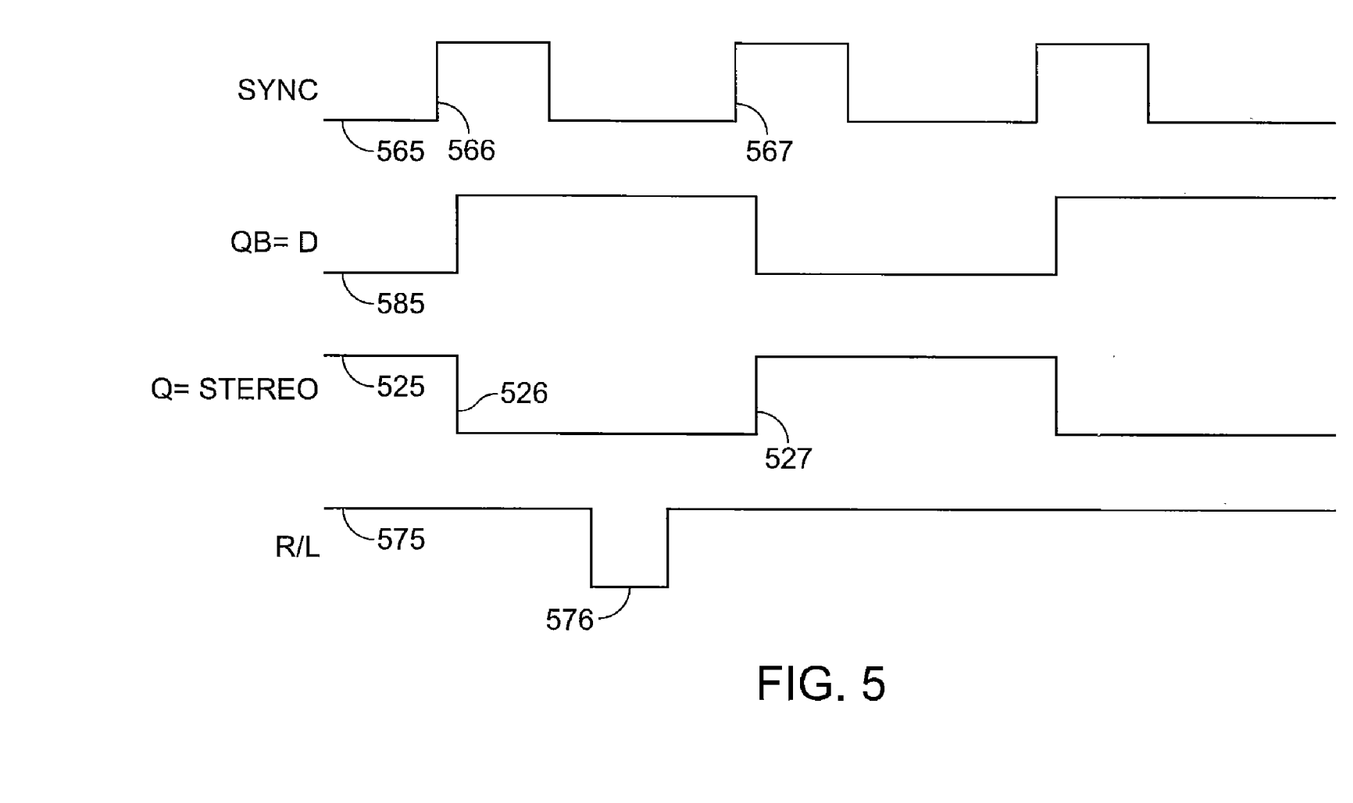
FIG. 5 is timing diagram illustrating the operation of the circuit of FIG. 4.

FIG. 5 is timing diagram illustrating the operation of the circuit of FIG. 4. Included is a sync signal 565, which may be the sync signal on line 465, a D input 585, which may be the signal on line 485, stereo signal 525, which may be the stereo signal on line for 25, and a right/left signal 575, which may be the right/left signal on line 475 provided by the graphic system 410. The sync signal 565 alternates between a low level and a high level. When the sync signal is low, graphical information is provided to the monitor. When the sync signal 565 is high, a vertical retrace occurs. Since the QB output of the flip-flop 480 is feed back to the D input, the polarity of the signal at the D input has the opposite state as the Q output which is provided as the stereo signal on line 425. Accordingly, at each rising edge of the sync signal 565, the Q and QB output signals on lines 525 and 585 change state.

Specifically, as can be seen, at the first rising edge 566 of the sync signal 565, the D input 585 is low. Accordingly, at a time 526, which corresponds to the clock-to-Q output delay of flip-flop 580, the stereo signal 525 is low. Similarly, at the next rising edge 567 of the sync signal 565, the D input is high, and at 527 the stereo output 525 returns high. A right/left signal 575 is shown as being asserted low at 576. But at 576 the stereo signal 525 is in the correct state, and the right/left signal 575 has no effect.

Figure 6:
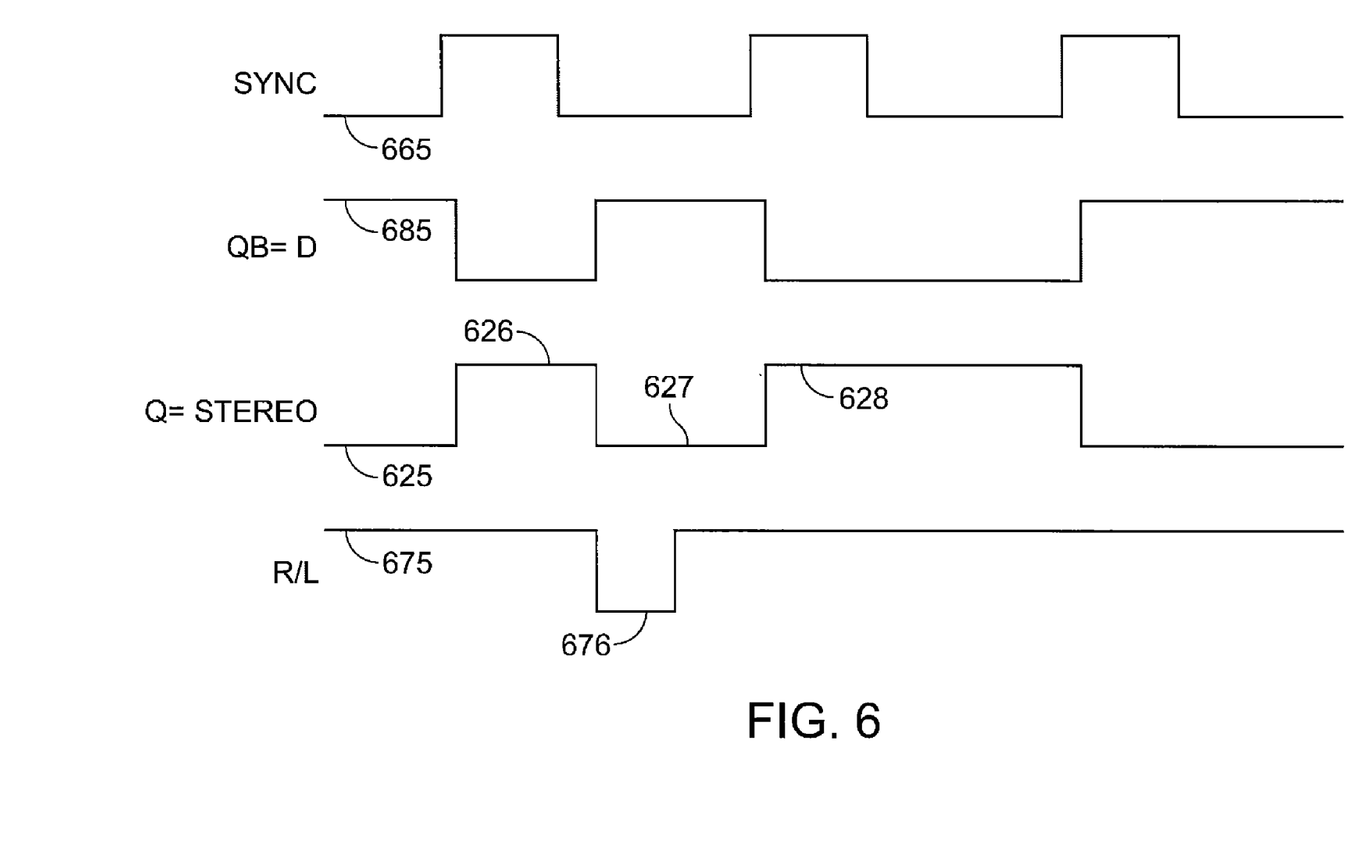
FIG. 6 is a timing diagram illustrating the operation of the circuit of FIG. 4 when the polarity of the divide-by-two flip-flop reverses state.

FIG. 6 is a timing diagram illustrating the operation of the circuit of FIG. 4 when the polarity of the divide-by-two flip-flop 580 reverses state. Included are sync signal 665, which may be the sync signal on line 465, D input 685, which may be the signal on line 485, stereo signal 625, which may be the signal on line 425, and right/left signal 675, which may be the right/left signal on line 475. In this example, the stereo signal 625 is in the incorrect state at time 626, that is, the state of flip-flop 480 is reversed. The right/left signal 675 is asserted low at 676, when the stereo signal 625 is high. At time 627, the stereo signal 625 returns low. Accordingly, beginning at time 628, the stereo signal 625 is a synchronized to the right or left frames being displayed on the monitor.

Figure 7:
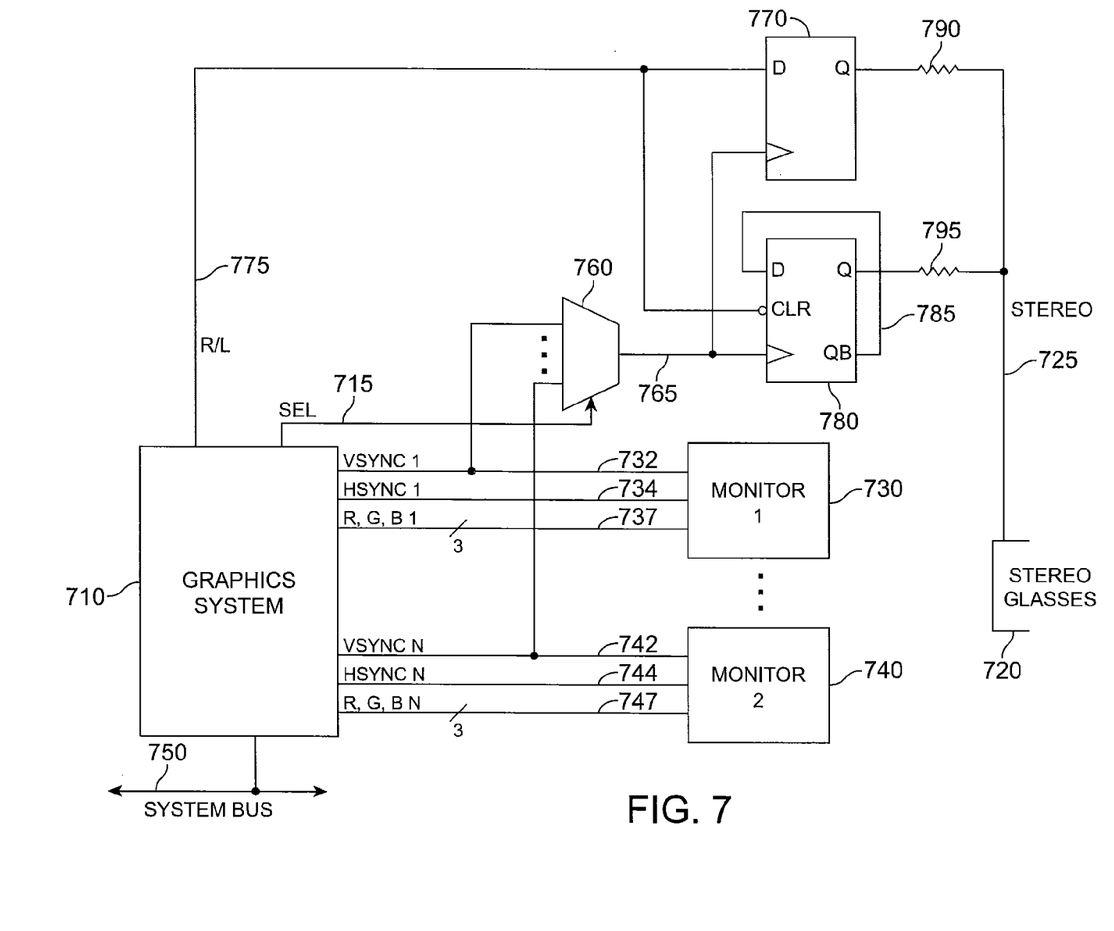
FIG. 7 is a block diagram of another exemplary embodiment of the present invention.

FIG. 7 is a block diagram illustrating an exemplary embodiment of the present invention. Included are a graphics system 710 coupled to a system bus 715, stereo glasses 720, first monitor 730, last monitor 740, multiplexer 760, first flip-flop 770, second flip-flop 780, and select resistors 790 and 795. Again, the graphics system 710 may be a graphics board residing in a computer system. Alternately the graphic system may be two or more graphics boards housed in one or more computers or computer systems. Graphics system 710 provides video information to the first monitor 730 and the last monitor 740. Again, in other embodiments, there may be video information supplied to only one monitor, or two or more monitors. The graphic system 710 may receive video and timing information on the system bus 750 from one or more processors or computer systems.

The graphic system 710 provides timing information, in this example the vertical and horizontal signals Vsync1 on line 732 and Hsync1 on line 734 to the first monitor 730. The graphic system 710 also provides video information, in this example, red, green, and blue on lines 737 to the first monitor 730. In other embodiments, different timing and video signals may be provided. In this example, the graphic system 710 provides similar information to other monitors, such as the last monitor 740. Specifically graphics system 710 provides the VsyncN and HsyncN on lines 742 and 744, and red, green, and blue on lines 747.

Multiplexer 760 receives at its inputs some or all of the vertical sync signals provided by the graphic system 710 to the monitors. Specifically, multiplexer 760 receives Vsync1 on line 732 and VsyncN on line 742. Multiplexer 760 selects the appropriate Vsync signal under control of SEL line or lines 715. Again, where are a system includes two monitors, only one select line 715 is needed. Where there are more than two monitors, more selects lines 715 may be needed, or select information may be stored by multiplexer 760. The selected sync signal is provided as an output by multiplexer 760 on line 765. In this example, the signal on line 765 drives the clock inputs of flip-flops 770 and 780. Flip-flop 780 divides the sync signal provided as a clock by the multiplexer 760 on line 765. Flip-flop 770 retimes the right/left signal on line 775.

The outputs of flip-flops 770 and 775 are selectively connected to the input of the stereo glasses 720 by inserting one of the resistors 790 or 795. This resistors may have zero ohm or other appropriate value. In other embodiments, other devices such as electronic switches under the control the graphics system or other circuit may be used.

Specifically, the output of the retiming flip-flop 770 may be selected by inserting resistor 790 while leaving out resistor 795. This has the advantage of providing a circuit that does not lose polarity, as the divide-by-two flip-flop 780 might, though the right/left signal on line 775 is updated by the graphics system 710 each frame, and should meet the set-up and hold times required by the flip-flop 770.

The output of the divide-by-two flip-flop 780 may be selected by inserting resistor 795 while leaving out resistor 790. This has the advantage of simplifying the right/left signal on line 775 that is generated by the graphics system 710, that is, only an occasional reset is needed to avoid sustained polarity reversals, though it may lose polarity for several frames.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of synchronizing a stereo viewing device to a selected video stream, the selected video stream selected from a plurality of video streams, the method comprising:
providing the plurality of video streams to a corresponding plurality of display devices, each video stream comprising a synchronizing signal;
receiving a select signal generated to select one of the plurality of video streams;
selecting a first signal using the select signal, wherein the first signal is a synchronizing signal for the selected video stream;
using the first signal to generate a second signal; and
providing the second signal to the stereo viewing device, wherein the first signal has a frequency, and the second signal is generated by dividing the frequency of the first signal by two.

2. The method of claim 1 wherein the selected video stream comprises a stereo image, the stereo image comprising first and second views, the method further comprising:
providing a third signal, the third signal indicating whether the first view or the second view is present in the selected video stream; and
retiming the third signal using the first signal.

3. The method of claim 2 wherein the third signal is retimed using a flip-flop.

4. The method of claim 1 wherein the first signal is a vertical synchronizing signal for the selected video stream.

5. The method of claim 1 wherein the frequency of the first signal is divided by two using a flip-flop.

6. The method of claim 5 further comprising:
providing a third signal to the flip-flop,
wherein the third signal is used to force the flip-flop to a known state.

7. A method of synchronizing a stereo viewing device to a selected video stream comprising a stereo image, the selected video stream selected from a plurality of video streams, the method comprising:
receiving a plurality of signals, each of the plurality of signals synchronous with one of the plurality of video streams, each video stream provided to a corresponding monitor;
receiving a select signal generated to select one of the plurality of signals;
selecting a first signal in the plurality of signals using the select signal, the first signal synchronous with the selected video stream;
receiving a second signal, the second signal generated to control the stereo viewing device, wherein the second signal is retimed using a flip-flop;
generating a third signal by retiming the second signal using the first signal; and
providing the third signal to the stereo viewing device.

8. The method of claim 7 wherein the first signal is a vertical synchronizing signal for the selected video stream.

9. The method of claim 7 wherein the select signal is received on two signal lines.

10. A method of synchronizing a stereo viewing device to a video stream, the video stream selected from a plurality of video streams, the method comprising:
receiving a plurality of signals, each of the plurality of signals synchronous with one of the plurality of video streams, the plurality of video streams provided such that they may be received by a corresponding plurality of monitors;
receiving a select signal generated to select one of the plurality of signals;
selecting a first signal from the plurality of signals using the select signal, the first signal having a first frequency;
dividing the frequency of the first signal to generate a second signal having a second frequency, wherein the frequency of the first signal is divided by two using a flip-flop; and
providing the second signal to the stereo viewing device.

11. The method of claim 10 wherein the first signal is a vertical synchronizing signal.

12. The method of claim 10 wherein the first frequency is twice the second frequency.

13. The method of claim 10 further comprising:
providing a third signal to the flip-flop,
wherein the third signal is used to force the flip-flop to a known state.

14. A circuit for synchronizing a stereo viewing device to a video stream comprising:
a graphics system configured to generate a first video stream, a second video stream, a first signal synchronous with the first video stream, a second signal synchronous with the second video stream, and a third signal to select the first signal or the second signal, and further configured to provide the first video stream to a first display device and the second video stream to a second display device; and
a logic circuit configured to receive the first signal, the second signal, and the third signal, and to provide a fourth signal to the stereo viewing device, wherein the logic circuit comprises a multiplexer and a flip-flop, the multiplexer configured to selectively couple the first signal or the second signal to the flip-flop.

15. The circuit of claim 14 wherein the logic circuit is further configured to receive a fifth signal, wherein the fifth signal is used to force the flip-flop to a known state.

16. The circuit of claim 14 wherein the logic circuit is further configured to receive a fifth signal, wherein the fifth signal is retimed by the flip-flop.

17. A circuit for synchronizing a stereo viewing device to a video stream comprising:
a graphics processor configured to provide a first video stream to a first monitor and a second video stream to a second monitor; and
a logic circuit configured to receive a first signal synchronous with the first video stream, a second signal synchronous with a the second video stream, and a third signal generated to select the first signal or the second signal, and further configured to provide a fourth signal to the stereo viewing device, wherein the logic circuit comprises a multiplexer and a flip-flop, the multiplexer configured to selectively couple the first signal or the second signal to the flip-flop.

18. The circuit of claim 17 wherein the logic circuit is further configured to receive a fifth signal, wherein the fifth signal is used to force the flip-flop to a known state.

19. The circuit of claim 17 wherein the logic circuit is further configured to receive a fifth signal, wherein the fifth signal is retimed by the flip-flop to generate the fourth signal.

20. The circuit of claim 17 wherein the logic circuit is further configured to receive a fifth signal synchronous with a third video stream, and a sixth signal synchronous with a fourth video stream, wherein the third signal is generated to further select the fifth signal or the sixth signal.

21. A method of synchronizing a stereo viewing device comprising:

providing a plurality of video streams to a plurality of monitors, wherein the plurality of video streams are not synchronized;

synchronizing the stereo viewing device to a first video stream in the plurality of video streams;

receiving a selection of a second video stream in the plurality of video streams; and synchronizing the stereo viewing device to the second video stream, wherein the selection of the second video stream is made by a graphics system when the second video stream begins to comprise a stereo video stream.

22. The method of claim 21 wherein the selection of the second video stream is made by a user.

23. The method of claim 22 wherein the selection made by the user causes the first video stream to change from a first stereo mode to a first non-stereo mode, and causes the second stereo stream to change from a second non-stereo mode to a second stereo mode.

24. The method of claim 21 wherein the selection of the second video stream is made by a user via an input device selected from the group consisting of a keyboard and a mouse.

25. The method of claim 21 wherein the selection of the second video stream is made by a graphics system when the first video stream ceases to comprise a stereo video stream.

26. The method of claim 21 wherein the first video stream has a first refresh rate and the second video stream has a second refresh rate, the first refresh rate different from the second refresh rate.

\* \* \* \* \*